No. 695,114. Patented Mar. 11, 1902.
A. R. OHLMAN.
CALIPERS.
(Application filed Aug. 5, 1901.)
(No Model.)
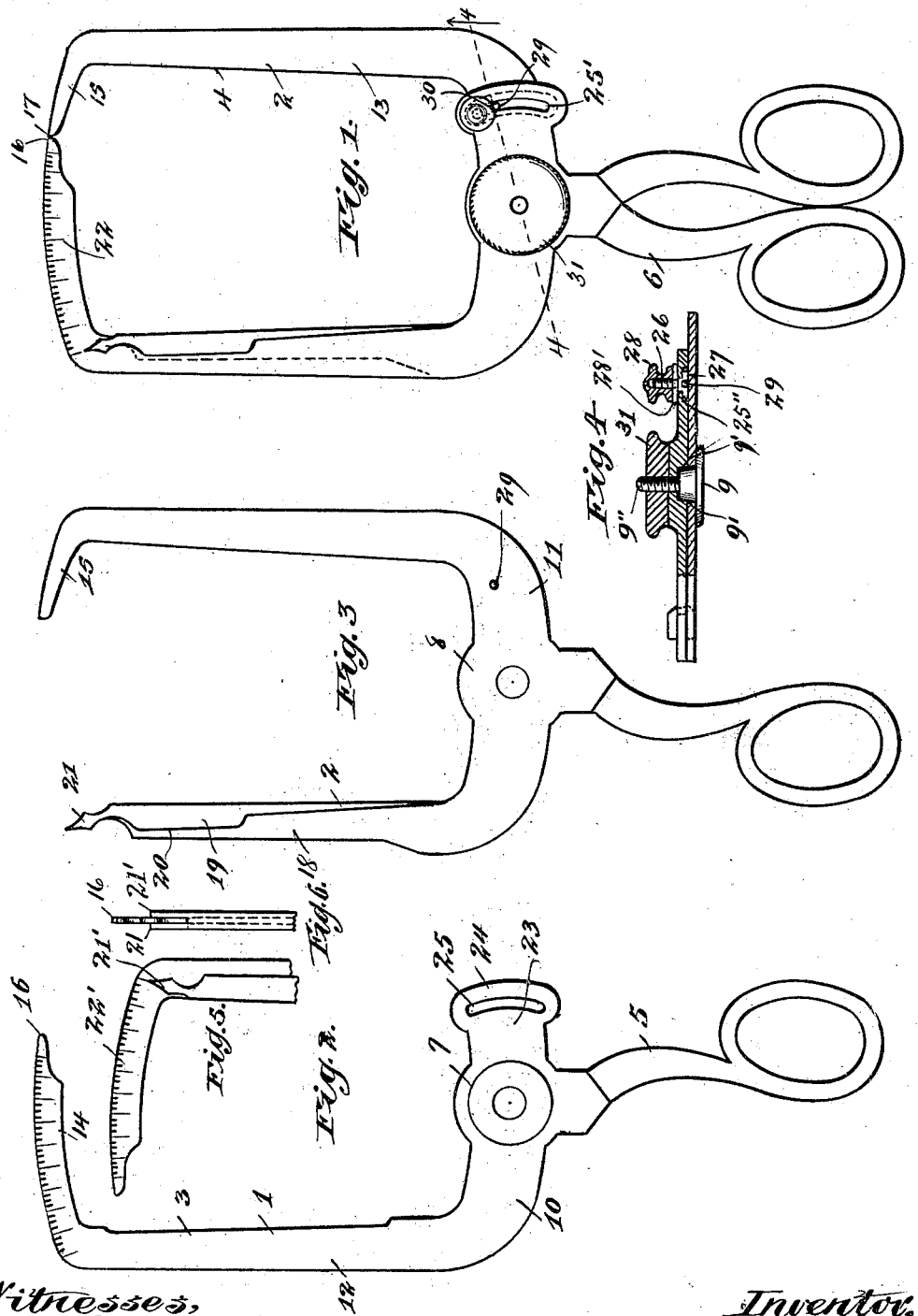
Witnesses,
F. S. Mann
Albert N. Graves
Inventor,
Albert R. Ohlman,
By Offield Towle & Linthicum
Attys.
THE NORRIS PETERS CO., PHOTO-LITHO., WASHINGTON, D. C.

ered sides of the inturned portion 14 of the
UNITED STATES PATENT OFFICE.

ALBERT R. OHLMAN, OF HARVEY, ILLINOIS.

CALIPERS.

SPECIFICATION forming part of Letters Patent No. 695,114, dated March 11, 1902.

Application filed August 5, 1901. Serial No. 70,901. (No model.)

*To all whom it may concern:*

Be it known that I, ALBERT R. OHLMAN, a citizen of Harvey, in the county of Cook and State of Illinois, have invented certain new and useful Improvements in Calipers, of which the following is a specification.

This invention relates to improvements in calipers, and refers more specifically to an improved caliper provided with a graduated scale and index-hand moving over the same, so arranged as to be directly under the eye of the operator during the calipering operation.

Among the principal objects of the invention are to provide an instrument of the character referred to in which the measurements may be read direct and in units of substantially the same size as the units of measurement taken by the calipers; to provide a construction in which the reading of the instrument as determined by the index hand and scale is unaffected by any looseness of joint or inaccuracy of fitting together of the two main members; to provide a construction in which the index-hand moves over a graduated scale formed upon one of the two arms employed in taking the measurement, so that the eye of the workman may at the same time direct the application of the instrument and watch the movement of the pointer; to provide a construction with which the reading may be taken with equal facility and certainty from either side of the instrument; to provide improved means for setting the instrument at any desired reading and retaining this reading while at the same time the instrument is capable of being freely opened and manipulated for taking other readings without losing or changing the given reading to which it may have been set; to provide a caliper which, owing to its peculiar construction and arrangement, may be adjusted to open and shut with perfect freedom and ease without thereby endangering the accuracy of its readings; to provide an instrument having certain features of construction which render it more convenient and capable of being operated more rapidly, and in general to provide a simple, improved, and reliable instrument of the character referred to.

To these ends the invention consists in the matters hereinafter described, and more particularly pointed out in the appended claims, and the same will be readily understood from the following description, reference being had to the accompanying drawings, in which—

Figure 1 is a plan view of the complete instrument assembled and shown in closed position. Figs. 2 and 3 are similar views of the two main members separated from each other, and Fig. 4 is a transverse sectional view taken on line 4 4 of Fig. 1. Fig. 5 is a fragmentary view of the reverse side of the graduated portion of the blade member shown in Fig. 1, and Fig. 6 is an edge view of the parts shown in Fig. 5 looking at the inner edge.

Referring to said figures, 1 and 2 respectively designate as a whole the two main members of the caliper, each of which members comprises in the preferred embodiment shown an outwardly-curved blade, as 3 and 4, respectively, a handle member, as 5 and 6, respectively, and a main body or shank, as 7 8, respectively, the members being pivoted together in intersecting relation by means of a pivot-bolt 9, extending therethrough.

It will be understood, of course, that the precise shape of the caliper-blades is not essential; but in the preferred construction shown herein each blade comprises a base portion, as 10 11, respectively, extending from the pivotal point outwardly in opposite directions, main blade portions 12 and 13, respectively, which extend substantially parallel with each other, and inturned end or toe portions 14 and 15, respectively, the extreme inner points 16 and 17 of which are the portions applied to the object in taking measurements, as usual.

In addition to the main blade 4 one caliper member of that designated 2 in the present instance is provided with an index member or pointer 18, which in its general shape corresponds substantially to the corresponding portions of the opposite blade member 1, so that when the calipers are in closed position said index-hand will lie substantially in register with said opposite blade, as shown clearly in Fig. 1. The index member 18 is preferably provided with double points arranged to respectively sweep over the opposite sides of the inturned portion 14 of the blade member 1, said index member being to this end formed with an integral folded back portion 19, which extends from the pointed end of the hand backwardly throughout a part of the length of the pointer and is divided or bifurcated a sufficient distance inwardly from the pointed end to accommodate the inturned portion 14 of the blade member 1.

The inturned portion 14 of the member 1 is provided with a graduated scale upon each of its face sides, as indicated at 22 22', these scales being arranged to exactly register with each other and desirably running from zero at the outer end of the scale or that remote from the calipering-point upwardly. The index member or hand 18 is rigid with the blade member 2 and bears such relation to the latter that when the calipers are exactly closed the two points of the hand will point to zero of the respective scales. It will be obvious, therefore, that as the calipers are opened to varying extents the distance to which they are opened will be indicated upon the two scales, which may be divided into any desired units.

In order to provide means for setting the calipers in any position of adjustment or so as to retain any given reading, while at the same time permitting the instrument to be opened, both for the purpose of disengaging it after the reading has been taken and for the purpose of taking other readings, if desired, without losing the reading to which it has been set, improved means are provided as follows: 23 designates as a whole an extension formed integrally with the main member 1 and arranged to overlie the base portion 11 of the opposite member and preferably to register with the latter when the calipers are in closed position. The end of the extension 23 is provided with a slot 25, formed concentrically with the axis of the pivot 9, and upon the base portion 11 of the member 2 is rigidly mounted a stud 29, which protrudes within the slot 25 and serves by engagement with the outer end of said slot 25' to limit the extent to which the calipers may be opened.

27 designates a stop-block, which is mounted to reciprocate in the slot 25 and is capable of being locked in various positions of adjustment along said slot, as will now be explained. To this end the side walls of the slot 25 are undercut, as indicated at 25'', and the sides of the block are correspondingly shaped to fit and slide therein, this construction serving to hold the block within the slot when the members of the instrument are assembled, while permitting the block to be freely adjusted. At its upper side the stop-block 27 is provided with a threaded extension or stem 26, upon which is fitted a thumb-nut 28, which may be turned down to clamp the stop-block to the overhanging portions of the slot 25. Preferably and as shown herein a washer 28' will be interposed between the acting face of the thumb-nut and the surface of the slotted extension. In use the stop-block serves to limit the distance to which the caliper-blades may be closed by forming a stop against which the stop-stud 29 engages, and that side of the block proximate to the said stop-stud is therefore desirably recessed slightly, as indicated at 30, to afford a larger bearing-surface between the contacting parts.

The handle portions of the two blade members are constructed and shaped substantially like the handles of an ordinary pair of scissors, and this I deem a feature of some importance, inasmuch as it enables the instrument to be manipulated with the utmost convenience and with the fingers of a single hand, and this feature becomes the more important for an instrument of this peculiar construction, in which, as will hereinafter appear, it is entirely practicable to unite the blade members by pivotal connection, working freely and practically without frictional engagement with each other. The pivotal joint whereby the two members are united is formed in the present instance by means of a screw-threaded bolt provided with an enlarged journal portion 9', with which the blade members have pivotal engagement, and a reduced portion 9'', to which is applied the usual nut 31.

The operation of the instrument will be quite obvious from the foregoing description; but it is to be noted in this connection that the reading is taken upon a scale which is directly under the eye of the operator in applying the instrument and upon a scale which is provided with units substantially identical with the units of measurement which are actually taken by the instrument. It is also to be noted that owing to the fact that the index-hand is rigid with one of the blade members and sweeps over a scale formed upon a pair of the opposite member, which is arranged in the same arc of movement of the calipering-points, the measurement taken between the points will be indicated upon the scale with the greatest accuracy and unaffected by any looseness of joint which may exist in the pivotal connection between the two members. The instrument is therefore absolutely accurate, and whatever error in reading occurs will be that only which is due to inaccurate reading.

Another feature of great importance is the ability to detect variations in reading due to the yielding of the calipering-points, which are not readily appreciable to the touch, but are made obvious by movement of the hand over the scale—that is to say, the workman can readily detect by feeling when the caliper-blades are both in touch, but cannot detect by feeling any slight yielding of the blades after they have actually come into contact—as, for example, when the instrument is moved around over various parts of the surface being calipered. However, with an instrument of this kind any yielding or springing of the blades is at once made perceptible by the movement of the index-hand over the scale, so that the workman can detect variations of much less magnitude than with the ordinary calipers heretofore in use. It will be understood that in using the setting device to take and preserve any given reading the operator will first apply the calipers to the given object which is to form the standard by which other readings are taken, thereby moving the fixed stud 29 to a certain position in the slot 25. While the calipers are still in engagement with the object he will set the stop-block 27 up against the stud 29 and lock it in this position, thereby obviously locking the blades against closing beyond this limit. It will be obvious, however, that although the blades are locked against approach beyond the limit set, they are nevertheless free to open out to full extent, so that the use of the calipers is unaffected for taking readings of the same or larger dimensions than that to which the instrument has been set.

While I have herein described a preferred embodiment of my invention, yet it will be obvious that the details thereof may be modified without departing from the invention. For example, that feature of the invention whereby I am able to set the instrument at the given reading might be equally well embodied in a pair of inside calipers instead of those of the type herein shown.

I claim as my invention—

1. A caliper, comprising a pair of caliper-blades pivotally united, one of said blades provided with an inturned calipering end portion having a scale thereon formed to extend concentric with the axis of the pivot and a scale-pointer rigid with the opposite blade member and arranged to traverse the scale.

2. A caliper, comprising a pair of caliper-blades pivotally united, one of said blades provided with an inturned calipering end portion having a scale thereon formed to extend concentric with the axis of the pivot and substantially in the arc of movement of the calipering-points, a scale-pointer rigid with the opposite blade member and arranged to traverse said scale, and a setting device for adjustably limiting the movement of said blades relatively to each other while leaving them free to move in the opposite direction.

3. A caliper, comprising a pair of caliper-blades pivotally united, one of said blades provided with an inturned calipering end portion formed to extend concentric with the axis of the pivot and provided with a scale thereon, a scale-pointer rigid with the opposite blade member and arranged to traverse said scale, and a setting device for adjustably limiting the movement of said blades relatively to each other or permitting them to move freely in the opposite direction, comprising a stop-block movably mounted upon one member in position for engagement with a part upon the opposite member, and a set-screw for locking said stop-block in adjusted position.

4. A caliper, comprising a pair of blades pivotally united and each provided with an inwardly-extending calipering-point, one of said extensions being formed to extend concentrically with the pivotal axis of the blades and provided with a graduated scale thereon, a scale-pointer having the form of an arm rigid with the blade opposite the one provided with said scale and arranged to coöperate with the scale, and means for adjustably limiting the approach of the caliper-blades comprising a segmental slot formed concentrically with the pivotal axis of the blades through an overlocking portion of one member, a stop-block mounted to slide within said slot, a clamping-screw arranged to lock the stop-block in adjusted position and a stop-stud carried by the opposite member and extending within said slot.

5. A caliper, comprising a pair of blades pivotally united scissor fashion and each member provided at one end with a calipering-point and at its opposite end with an open-looped or scissor-like handle, and means for locking said caliper-blades in rigid relation with each other, substantially as described.

6. A caliper, comprising a pair of caliper-blades pivotally united, one of said blades being provided with an inturned calipering end portion formed to extend concentric with the axis of the pivot and substantially in the arc of movement of the calipering-points, graduated scales upon opposite sides of said inturned end portion and a bifurcated index-hand, the two points of which coöperate with the respective scales, substantially as described.

7. A caliper, comprising a pair of blades pivotally united scissor fashion and each member provided at one of its ends with a caliper-point and at its opposite end with an open-looped scissor-like handle, an indicator and index respectively connected and moving with said blades and means for clamping the blades at any given reading of the indicator.

ALBERT R. OHLMAN.

Witnesses:
ALBERT H. GRAVES,
FREDERICK C. GOODWIN.